United States Patent
Yamazaki et al.

(10) Patent No.: US 8,154,697 B2
(45) Date of Patent: Apr. 10, 2012

(54) LIQUID CRYSTAL DISPLAY AND METHOD OF DRIVING SAME

(75) Inventors: Shunpei Yamazaki, Tokyo (JP); Takeshi Nishi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 12/613,725

(22) Filed: Nov. 6, 2009

(65) Prior Publication Data

US 2010/0060811 A1    Mar. 11, 2010

Related U.S. Application Data

(63) Continuation of application No. 11/218,436, filed on Sep. 6, 2005, now Pat. No. 7,616,282, and a continuation of application No. 09/686,653, filed on Oct. 10, 2000, now Pat. No. 6,963,382, and a continuation of application No. 08/751,365, filed on Nov. 18, 1996, now Pat. No. 6,160,600.

(30) Foreign Application Priority Data

Nov. 17, 1995   (JP) ...................... 7-323677

(51) Int. Cl.
*G02F 1/1343*   (2006.01)
(52) U.S. Cl. ..................................... 349/141
(58) Field of Classification Search .................. 349/141
See application file for complete search history.

(56) References Cited

U.S. PATENT DOCUMENTS

| | | | |
|---|---|---|---|
| 3,774,989 A | 11/1973 | Takahashi | |
| 3,814,501 A | 6/1974 | Schindler | |
| 3,838,909 A | 10/1974 | Fitzgibbons | |
| 3,844,908 A | 10/1974 | Matsuo | |
| 3,864,905 A | 2/1975 | Richardson | |
| 4,097,128 A | 6/1978 | Matsumoto | |
| 4,226,898 A | 10/1980 | Ovshinsky | |
| 4,345,249 A * | 8/1982 | Togashi | ........................ 345/103 |
| 4,523,370 A | 6/1985 | Sullivan | |
| 4,557,036 A | 12/1985 | Kyuragi | |
| 4,597,637 A | 7/1986 | Ohta | |
| 4,759,610 A | 7/1988 | Yanagisawa | |

(Continued)

FOREIGN PATENT DOCUMENTS

EP    0 376 648    7/1990

(Continued)

OTHER PUBLICATIONS

Original Japanese Language Office Action dated May 8, 2007 in Japanese Patent Application No. 07-323677 (7 pages); and English translation of Office Action dated May 8, 2007 in Japanese Patent Application No. 07-323677 (13 pages).

*Primary Examiner* — James Dudek
(74) *Attorney, Agent, or Firm* — Fish & Richardson P.C.

(57) ABSTRACT

There is disclosed a lightweight and small liquid crystal display which achieves low power consumption and in which the optical anisotropy of the liquid crystal material is compensated for in order to enhance the viewing angle characteristics and the response speed of the liquid crystal material. Display electrodes and a common electrode are formed on one of the substrates. The orientation of the liquid crystal material is of the HAN (hybrid alignment nematic) type. This compensates for the optical anisotropy of the liquid crystal material and improves the response speed.

17 Claims, 4 Drawing Sheets

U.S. PATENT DOCUMENTS

| | | |
|---|---|---|
| 4,800,174 A | 1/1989 | Ishihara |
| 4,826,297 A | 5/1989 | Kubo et al. |
| 4,864,376 A | 9/1989 | Aoki |
| 4,923,286 A | 5/1990 | Grupp |
| 5,003,356 A | 3/1991 | Wakai |
| 5,035,490 A | 7/1991 | Hubby, Jr. |
| 5,055,899 A | 10/1991 | Wakai |
| 5,056,895 A | 10/1991 | Kahn |
| 5,066,110 A | 11/1991 | Mizushima |
| 5,084,905 A | 1/1992 | Sasaki |
| 5,091,334 A | 2/1992 | Yamazaki |
| 5,128,782 A | 7/1992 | Wood |
| 5,128,784 A | 7/1992 | Suzuki et al. |
| 5,132,821 A | 7/1992 | Nicholas |
| 5,148,301 A | 9/1992 | Sawatsubashi et al. |
| 5,194,976 A | 3/1993 | Nakano |
| 5,200,846 A | 4/1993 | Hiroki |
| 5,206,183 A | 4/1993 | Dennison |
| 5,227,900 A | 7/1993 | Inaba |
| 5,233,449 A | 8/1993 | Shioji |
| 5,235,195 A | 8/1993 | Tran |
| 5,250,931 A | 10/1993 | Misawa |
| 5,270,846 A | 12/1993 | Watanabe |
| 5,283,675 A | 2/1994 | Ooi et al. |
| 5,287,205 A | 2/1994 | Yamazaki |
| 5,289,016 A | 2/1994 | Noguchi |
| 5,293,261 A | 3/1994 | Shashidhar |
| 5,306,651 A | 4/1994 | Masumo |
| 5,313,562 A | 5/1994 | Wiltshire |
| 5,327,001 A | 7/1994 | Wakai |
| 5,341,012 A | 8/1994 | Misawa et al. |
| 5,408,345 A | 4/1995 | Mitsui et al. |
| 5,412,493 A | 5/1995 | Kunii et al. |
| 5,416,619 A | 5/1995 | Koike |
| 5,432,626 A | 7/1995 | Sasuga et al. |
| 5,434,433 A | 7/1995 | Takasu et al. |
| 5,448,385 A | 9/1995 | Deffontaines |
| 5,453,858 A | 9/1995 | Yamazaki |
| 5,488,000 A | 1/1996 | Zhang |
| 5,495,353 A | 2/1996 | Yamazaki |
| 5,499,123 A | 3/1996 | Mikoshiba |
| 5,500,538 A | 3/1996 | Yamazaki |
| 5,526,149 A | 6/1996 | Kanbe et al. |
| 5,559,617 A | 9/1996 | Mitsui |
| 5,568,288 A | 10/1996 | Yamazaki |
| 5,574,292 A | 11/1996 | Takahashi |
| 5,576,867 A | 11/1996 | Baur et al. |
| 5,583,369 A | 12/1996 | Yamazaki |
| 5,583,678 A | 12/1996 | Nishino |
| 5,585,951 A | 12/1996 | Noda |
| 5,598,285 A * | 1/1997 | Kondo et al. .............. 349/39 |
| 5,608,232 A | 3/1997 | Yamazaki |
| 5,612,799 A | 3/1997 | Yamazaki |
| 5,639,698 A | 6/1997 | Yamazaki |
| 5,684,365 A | 11/1997 | Tang |
| 5,686,328 A | 11/1997 | Zhang |
| 5,691,791 A | 11/1997 | Nakamura |
| 5,705,829 A | 1/1998 | Miyanaga |
| 5,712,495 A | 1/1998 | Suzawa |
| 5,724,112 A | 3/1998 | Yoshida |
| 5,731,628 A | 3/1998 | Terashima |
| 5,737,051 A | 4/1998 | Kondo |
| 5,745,203 A | 4/1998 | Valliath |
| 5,763,899 A | 6/1998 | Yamazaki |
| 5,781,261 A | 7/1998 | Ohta |
| 5,786,876 A | 7/1998 | Ota |
| 5,801,802 A | 9/1998 | Inoue et al. |
| 5,818,077 A | 10/1998 | Takahashi et al. |
| 5,818,550 A | 10/1998 | Kadota |
| 5,821,138 A | 10/1998 | Yamazaki |
| 5,831,707 A | 11/1998 | Ota |
| 5,841,498 A | 11/1998 | Baur et al. |
| 5,841,499 A | 11/1998 | Baur et al. |
| 5,844,254 A | 12/1998 | Manning |
| 5,849,043 A | 12/1998 | Zhang |
| 5,870,160 A | 2/1999 | Yanagawa |
| 5,879,977 A | 3/1999 | Zhang |
| 5,883,685 A | 3/1999 | Mazaki |
| 5,892,562 A | 4/1999 | Yamazaki |
| 5,897,347 A | 4/1999 | Yamazaki |
| 5,899,547 A | 5/1999 | Yamazaki |
| 5,905,555 A | 5/1999 | Yamazaki |
| 5,910,271 A | 6/1999 | Ohe |
| 5,914,761 A | 6/1999 | Ohe |
| 5,933,205 A | 8/1999 | Yamazaki |
| 5,946,059 A | 8/1999 | Yamazaki |
| 5,952,708 A | 9/1999 | Yamazaki |
| 5,953,088 A | 9/1999 | Hanazawa et al. |
| 5,956,579 A | 9/1999 | Yamazaki |
| 5,959,599 A | 9/1999 | Hirakata |
| 5,963,278 A | 10/1999 | Yamazaki |
| 5,977,562 A | 11/1999 | Hirakata |
| 5,990,542 A | 11/1999 | Yamazaki |
| 6,011,277 A | 1/2000 | Yamazaki |
| 6,011,606 A | 1/2000 | Ohe |
| 6,034,757 A | 3/2000 | Yanagawa et al. |
| 6,049,092 A | 4/2000 | Konuma et al. |
| 6,060,725 A | 5/2000 | Zhang et al. |
| 6,084,247 A | 7/2000 | Yamazaki |
| 6,108,065 A | 8/2000 | Ota |
| 6,108,066 A | 8/2000 | Yanagawa et al. |
| 6,110,770 A | 8/2000 | Zhang |
| 6,115,097 A | 9/2000 | Yamazaki |
| 6,141,066 A | 10/2000 | Matsushima |
| 6,239,470 B1 | 5/2001 | Yamazaki |
| 6,246,453 B1 | 6/2001 | Zhang |
| 6,266,117 B1 | 7/2001 | Yanagawa et al. |
| 6,441,468 B1 | 8/2002 | Yamazaki |
| 6,445,059 B1 | 9/2002 | Yamazaki |
| 6,451,638 B1 | 9/2002 | Zhang |
| 6,501,097 B1 | 12/2002 | Zhang |
| 6,635,900 B1 | 10/2003 | Yamazaki |
| 2002/0117736 A1 | 8/2002 | Yamazaki |

FOREIGN PATENT DOCUMENTS

| | | |
|---|---|---|
| EP | 0 569 922 | 11/1993 |
| EP | 0 667 555 | 8/1995 |
| GB | 2274723 | 8/1994 |
| JP | 53-048542 A | 5/1978 |
| JP | 54-041153 | 4/1979 |
| JP | 55-032026 | 3/1980 |
| JP | 56-091277 | 7/1981 |
| JP | 59-153526 A | 10/1984 |
| JP | 60-043631 | 3/1985 |
| JP | 61-086783 | 5/1986 |
| JP | 62-026858 | 2/1987 |
| JP | 62-194231 A | 8/1987 |
| JP | 63-21907 | 5/1988 |
| JP | 02-053028 | 2/1990 |
| JP | 02-234134 | 9/1990 |
| JP | 03-188419 | 8/1991 |
| JP | 04-315129 | 11/1992 |
| JP | 05-011281 | 1/1993 |
| JP | 06-027456 | 2/1994 |
| JP | 06-043462 | 2/1994 |
| JP | 06-082762 | 3/1994 |
| JP | 06-118426 A | 4/1994 |
| JP | 06-160878 | 6/1994 |
| JP | 06-202073 | 7/1994 |
| JP | 06-214244 | 8/1994 |
| JP | 06-244103 | 9/1994 |
| JP | 06-244104 | 9/1994 |
| JP | 07-036058 | 2/1995 |
| JP | 07-043707 | 2/1995 |
| JP | 07-043716 | 2/1995 |
| JP | 07-043744 | 2/1995 |
| JP | 07-072491 | 3/1995 |
| JP | 07-120746 | 5/1995 |
| JP | 07-120791 | 5/1995 |
| JP | 07-134301 | 5/1995 |
| JP | 07-159773 | 6/1995 |
| JP | 07-225388 | 8/1995 |
| JP | 07-239483 | 9/1995 |

| | | | | | |
|---|---|---|---|---|---|
| JP | 07-253573 | 10/1995 | JP | 08-122761 | 5/1996 |
| JP | 07-261181 A | 10/1995 | WO | 91/10936 A1 | 7/1991 |
| JP | 07-270779 | 10/1995 | | | |
| JP | 07-294912 | 11/1995 | * cited by examiner | | |

US 8,154,697 B2

LIQUID CRYSTAL DISPLAY AND METHOD OF DRIVING SAME

CROSS-REFERENCE TO RELATED APPLICATIONS

This application is a continuation of U.S. application Ser. No. 11/218,436, filed Sep. 6, 2005, now allowed, which is a continuation of U.S. application Ser. No. 09/686,653, filed Oct. 10, 2000, now U.S. Pat. No. 6,963,382, which is a continuation of U.S. application Ser. No. 08/751,365, filed Nov. 18, 1996, now U.S. Pat. No. 6,160,600, which claims the benefit of a foreign priority application filed in Japan as Serial No. 07-323677 on Nov. 17, 1995, all of which are incorporated by reference.

FIELD OF THE INVENTION

The present invention relates to an active matrix liquid crystal display.

BACKGROUND OF THE INVENTION

Since liquid crystal displays are lighter and more compact display devices than CRTs, they find extensive application in computers, electronic calculators, clocks, and watches. The principle of operation of liquid crystal displays depends on a change in an optical property, such as interference, scattering, diffraction, optical rotation, or absorption, of a liquid crystal material. This change is caused by a variation in orientation of the liquid crystal molecules or a phase transition in response to application of an external field such as electric field or heat.

Generally, a liquid crystal display comprises a pair of substrates with a given spacing which is maintained at 1 to tens of micrometers. A liquid crystal material is held between these substrates, thus forming a liquid crystal panel. At least one of the substrates has transparency. Electrodes are formed on both or one of the substrates. Using these electrodes, an electric field is applied to the liquid crystal material to control the orientation of the liquid crystal molecules in each different pixel within the substrate plane, thus controlling the amount of light transmitted through the liquid crystal panel. In this way, a desired image is displayed. The liquid crystal display is constructed differently according to which is the above-described optical properties is utilized, i.e., depending on the mode of operation. For example, polarizing plates are mounted on the Outside of the liquid crystal panel.

To date, twisted-nematic (TN) liquid crystal displays and supertwisted-nematic (STN) liquid crystal displays enjoy wide acceptance. These kinds of liquid crystal displays make use of optical properties of liquid crystal materials such as optical rotation and interference of birefringent light. Both kinds require polarizing plates.

Where an image is displayed by the above-described liquid crystal display, numerous pixels must be controlled at the same time. For this purpose, various methods have been proposed. Among them, active matrix driving is used widely because it is a method capable of displaying image with high information content and high image quality. In particular, nonlinear active devices such as diodes or transistors are arranged at pixels. The individual pixels are electrically isolated from each other. Interference with unwanted signals is prevented. Thus, high image quality is accomplished. In this method, each pixel can be regarded as a capacitor to which an electrical switch is connected. Accordingly, the switches are turned on and off according to the need. As a result, electric charge can be made to go into and out of the pixels. If the switches are turned off, electric charge can be retained in the pixels and so the pixels can retain memory.

Problems with the Prior Art Techniques (1) Electric Power Consumed by Liquid Crystal Display In any kind of liquid crystal display, the liquid crystal material itself does not emit light. In order to have good visibility, a light source is incorporated in the equipment (transmissive type), or light incident on the equipment from surroundings is utilized (reflective type).

In the case of the transmissive type, if the intensity of light emitted by the light source is increased, then a brighter display device can be accomplished accordingly. However, this increases the power consumption of the whole apparatus. Most of the electric power is consumed by the light source in the transmissive type liquid crystal display. The ratio of the electric power consumed by the liquid crystal panel to the electric power consumed by the light source=1:100-1:1000. Hence, lower power consumption can be effectively accomplished by reducing the electric power expended by the light source. However, in both TN and STN types, it is customary to use two polarizing plates. This considerably lowers the transmittance of the liquid crystal panel. Therefore, in order to accomplish a bright display, it is necessary to increase the brightness of the light source. Since it is necessary to maintain a certain degree of brightness, a great reduction in the power consumption cannot be expected unless a light source of extremely high emission efficiency is employed.

On the other hand, in the case of the reflective type liquid crystal display, any special light source is not present inside the display device and so low power consumption and a reduction in size are enabled. Hence, it can be said that the reflective type is an ideal display device. However, it makes use of light coming from the surroundings: In order to achieve a brighter display device with a small amount of light, it is necessary to utilize the light efficiently. Since the reflective TN and STN types use no light sources, the brightness of the display devices is reduced accordingly.

(2) Response Speed

As image with higher information content is displayed, it is required that the response speed of the liquid crystal material be increased. However, the response time of the above-described TN liquid crystal display is tens of milliseconds. The response time of the STN liquid crystal display is on the order of 100 ms. At these response speeds, when the image created on the viewing screen moves across the screen, the image appears to tail off. In this way, the image quality is not good. In order to improve this phenomenon, it is necessary to utilize a liquid crystal material of higher response speed or to establish a mode of operation that accomplishes a higher response.

(3) Viewing Angle Characteristics

In both TN and STN types, when the liquid crystal display is viewed obliquely, a decrease in contrast, inversion of intermediate color hues, and other undesirable phenomena are observed, because the state of polarization of light entering obliquely changes in the liquid crystal layer of the liquid crystal display. In view of these problems, a method of dividing each pixel electrode into plural parts, a method of producing plural different states of orientation, and other methods have been proposed but no fundamental solution to the problems is available today.

SUMMARY OF THE INVENTION

It is an object of the present invention to provide a liquid crystal display which is lightweight, small in size, capable of displaying image of high image quality, shows decreased electric power consumption, and has improved response speed and improved viewing angle characteristics.

The above object is achieved in accordance with the teachings of the invention by a liquid crystal display comprising: a first insulating substrate having transparency; a second insulating substrate disposed opposite to said first insulating substrate and reflecting light; a liquid crystal material sandwiched between said first and second substrates; first pixel electrodes formed on said first insulating substrate; first conducting lines for applying electrical signals to said first pixel electrodes, said first conducting lines being formed on said first insulating substrate; second pixel electrodes formed on said first insulating substrate and electrically insulated from said first pixel electrodes and from said first conducting lines; and second conducting lines for applying electrical signals to said second pixel electrodes, said second conducting lines being formed on said first insulating substrate.

The above object is also achieved by a liquid crystal display comprising: a first insulating substrate having transparency; a second insulating substrate disposed opposite to said first insulating substrate and reflecting light; a liquid crystal material sandwiched between said first and second substrates; first pixel electrodes formed on said first insulating substrate; first conducting lines for applying electrical signals to said first pixel electrodes, said first conducting lines being formed on said first insulating substrate; second pixel electrodes formed on said first insulating substrate and electrically insulated from said first pixel electrodes and from said first conducting lines; and second conducting lines for applying electrical signals to said second pixel electrodes, said second conducting lines being formed on said first insulating substrate. The liquid crystal material is oriented in a first way near the first insulating substrate and in a second way near the second insulating, substrate. The first way is different from the second way.

The above object is also achieved by a liquid crystal display comprising: a first insulating substrate having transparency; a second insulating substrate disposed opposite to said first insulating substrate and reflecting light; a liquid crystal material sandwiched between said first and second substrates; first pixel electrodes formed on said first insulating substrate; first conducting lines for applying electrical signals to said first pixel electrodes, said conducting lines being formed on said first insulating substrate; second pixel electrodes formed on said first insulating substrate and electrically insulated from said pixel electrodes and from said first conducting lines; and second conducting lines for applying electrical signals to said second pixel electrodes, said second conducting lines being formed on said first insulating substrate. The liquid crystal material is oriented parallel or substantially parallel to the first insulating substrate near the first insulating substrate and oriented vertically or substantially vertically to the second insulating substrate near the second insulating substrate.

The above object is also achieved by a liquid crystal display comprising: a first insulating substrate having transparency; a second insulating substrate disposed opposite to said first insulating substrate and reflecting light; a liquid crystal material, sandwiched between said first and second substrates; first pixel electrodes formed on said first insulating substrate; first conducting lines for applying electrical signals to said first pixel electrodes, said conducting lines being formed on said first insulating substrate; second pixel electrodes formed on said first insulating substrate and electrically insulated from said first pixel electrodes and from said first conducting lines; second conducting lines for applying electrical signals to said second pixel electrodes, said second conducting lines being formed on said first insulating substrate; and nonlinear devices connected with said first or second pixel electrodes.

Furthermore, the present invention provides a method of driving a liquid crystal display comprising a first insulating substrate having transparency, a second insulating substrate disposed opposite to said first insulating substrate and reflecting light, a liquid crystal material sandwiched between said first and second substrates, first pixel electrodes formed on said first insulating substrate, first conducting lines for applying electrical signals to said first pixel electrodes, said first conducting lines being formed on said first insulating substrate, second pixel electrodes formed on, said first insulating substrate and electrically insulated from said first pixel electrodes and from said first conducting lines, and second conducting lines for applying electrical signals to said second pixel electrodes, said second conducting lines being formed on said first insulating substrate. This method consists of producing an electric field which has a component parallel to the substrates and drives on the liquid crystal material.

The structure of a liquid crystal display according to the present invention is shown in FIG. 1, where display electrodes 110 and a common electrode 111 are formed on a first substrate 101. A reflecting layer 103 is formed on a second substrate 102. The liquid crystal display further includes a biaxial film 104, a polarizing plate 105, and liquid crystal molecules 106. The optical axis of the polarizing plate is indicated by the arrows 107. Liquid crystal molecules close to the first substrate are oriented in one direction indicated by the arrows 108. Where the novel liquid crystal display is operated as an active matrix display, nonlinear devices 109 (only one is shown) are formed. The liquid crystal display further includes scanning (gate) lines 112 (only one is shown) and signal (source) lines 113 (only one is shown).

The first insulating substrate 101 is made from a material which has transparency and shows some degree of resistance to an external force. For example, glass, quartz, or other inorganic material is used as the material of the first substrate 101. Where TFTs are fabricated on the substrate, non-alkali glass or quartz is used. Where a decrease in the weight of the liquid crystal panel is required, a film showing only a small amount of birefringence such as PES (polyethylene sulfate) can be employed.

The material of the second substrate 102 exhibits some degree of resistance to an external force and reflects light. For instance, a thin film 103 of Al, Cr, or other material may be formed on the surface of the first substrate. It is also possible to use a substrate of Si.

In accordance with the present invention, in order to operate the liquid crystal material, an electric field having a component parallel to the substrates is produced inside the liquid crystal cell. This electric field will hereinafter be referred to as the lateral field. The orientation of the liquid crystal molecules is controlled by the strength of the lateral field. For this purpose, two kinds of electrodes which are electrically insulated from each other are formed on the first substrate. That is, they are the display electrodes 110 and the common electrode 111. The two kinds of electrodes are made from a conductive material such as Al or Cr. If the electrodes are made from a material having transparency such as ITO, then the aperture ratio of the pixels can be enhanced. The fundamental structure of the electrodes is shown in FIG. 2. The display electrodes 110 and common electrode 111 have alternately protruding portions and alternately nested in each other with a given spacing. If necessary, a reflector formed on the second substrate may be used as the electrodes.

The liquid crystal display according to the invention can use an optically compensated birefringence (OCB) mode to improve the viewing angle. In the OCB mode, the refractive index is effectively uniform in three dimensions. A fundamental structure for establishing the OCB mode comprises two polarizing plates together with a bend cell and a biaxial film inserted between them. This compensates for the refractive index in three dimensions. The liquid crystal molecules in the bend cell are oriented in the manner described now. The major axis of the liquid crystal molecules in the liquid crystal panel are parallel to the substrates near the substrates. The major axis rotate from one substrate to the other through 180° vertical to the substrates.

However, if the above-described structure is used as it is, then it follows that two polarizing plates are used. This makes it impossible to realize a bright liquid crystal display. Accordingly, a reflective liquid crystal display according to the invention needs only one polarizing plate. Specifically, in the OCB mode, the liquid crystal molecules are grouped in two classes about the midway plane between the two substrates. These two groups of liquid crystal molecules have a mirror-image relation to each other. If this midway plane is used as a turning point and the device is designed as a reflection type, then the liquid crystal molecules are oriented in exactly the same way as liquid crystal molecules in a HAN-mode (HAN: hybrid alignment nematic) liquid crystal display. In the HAN mode, liquid crystal molecules on the side of one substrate are oriented vertically, while liquid crystal molecules on the side of the other substrate are oriented horizontally. The orientation of the liquid crystal molecules 106 when no electric field is applied is shown in FIG. 1. A nematic material having positive or negative dielectric anisotropy is used as the liquid crystal material. To achieve the orientation, the substrate surface over which vertical orientation is assumed is processed with monobasic chromium complex, or a silane-coupling agent is applied in a manner not illustrated (not shown). Polyimide or the like is applied to the substrate surface over which horizontal orientation is assumed (not shown). The polyimide layer is rubbed in a well-known manner.

The liquid crystal material may be activated by a multiplexing method or active matrix method. In the multiplex method, only two kinds of electrodes, i.e., display electrodes and common electrode, are required to be formed on the first substrate. However, in the active matrix method, a switching device consisting of a nonlinear device 109 such as a thin-film transistor (TFT) or diode must be added to each pixel. The active layer of each TFT can be made from amorphous silicon or polysilicon (polycrystalline silicon). The nonlinear devices 109 are connected with the display electrodes 110.

A more advanced structure has a peripheral driver circuit composed of thin-film transistors which are integrated on a substrate. In this structure, pixel regions are integrated with the peripheral driver circuit region on the substrate. Therefore, it is easier to exploit the liquid crystal panel.

To improve the display characteristics, a black matrix 328 (FIG. 3(F)) is formed on those portions (i.e., conductive interconnects, nonlinear device portions, and peripheral driver circuit) which are not associated with image display. The black matrix 328 is made of a metal such as Cr or made of a transparent substance in which a black substance is dispersed to prevent contrast deterioration due to irregular reflection inside the liquid crystal display. An inorganic material such as glass or quartz or an organic material such as resins can be used as the transparent substance. Because of ease of fabrication, resinous materials are preferably used. Acrylic-based materials can be used as the resinous material. Carbon black or a pigment can be used as the black substance.

The method of dispersing the black material in the resinous material can be appropriately selected according to the used black substance. The materials can be stirred by a stirrer, by ball milling, or with three rolls. Where the black material is dispersed, if a small amount of surfactant or other dispersion-assisting agent is added, the dispersibility of the black material can be enhanced. In order to stabilize the dispersion and to make the black matrix layer thinner, the diameter of the particles of the black material is preferably less than 1 µm.

The black material can be formed on the TFT substrate by the same method as used to form a resist pattern by a conventional photolithographic process. First, an organic solution in which the black substance is dispersed is applied to the TFT substrate by spin-coating or print-coating techniques. The layer is patterned by a well-known photolithographic method. The layer is subsequently postbaked at about 200° C.

In the HAN mode described above, color control is possible by controlling the voltage applied to the liquid crystal material. Therefore, color filters which have been used in the prior art liquid crystal display are dispensed with.

The layers on the substrates are oriented in this way. The substrates are so placed that their surfaces having the oriented layers, TFTs, and transparent electrode are located opposite to each other. A liquid crystal material is held between the opposite substrates. Spacers are dispersed over the substrates to maintain the substrate spacing uniform. The used spacers have a diameter of 1 to 10 µm. The two substrates are bonded together with an epoxy adhesive or the like. The adhesive pattern is formed outside the substrates so that the pixel regions and peripheral driver circuit region are located inside.

In the novel liquid crystal display, display electrodes and a common electrode are formed on one substrate. An electric field parallel to the substrates drives the liquid crystal molecules. The liquid crystal molecules are made to assume the HAN orientation. This compensates for the optical anisotropy of the liquid crystal material and improves the viewing angle characteristics. Furthermore, the HAN orientation gives higher response speed than conventional TN and STN orientations. Where a reflector is formed on the other substrate, a reflective liquid crystal display can be built. Since it is not necessary to incorporate a light source in the display device, lower power consumption can be accomplished.

Other objects and features of the invention will appear in the course of the description thereof, which follows.

DETAILED DESCRIPTION OF THE INVENTION

Embodiment 1

Figure 1:
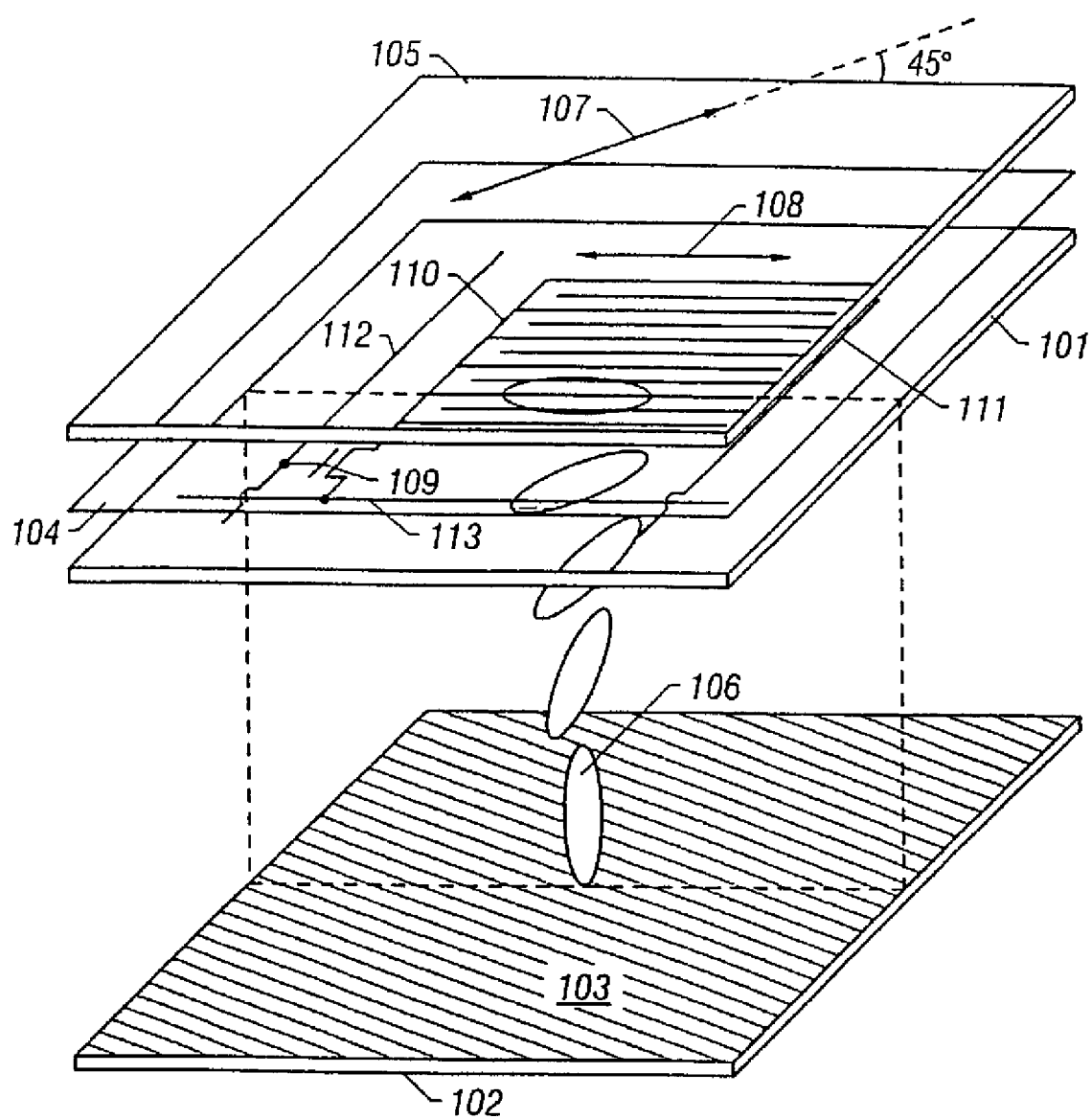
FIG. 1 is a schematic exploded perspective view of a liquid crystal display according to the present invention.
Figure 2:
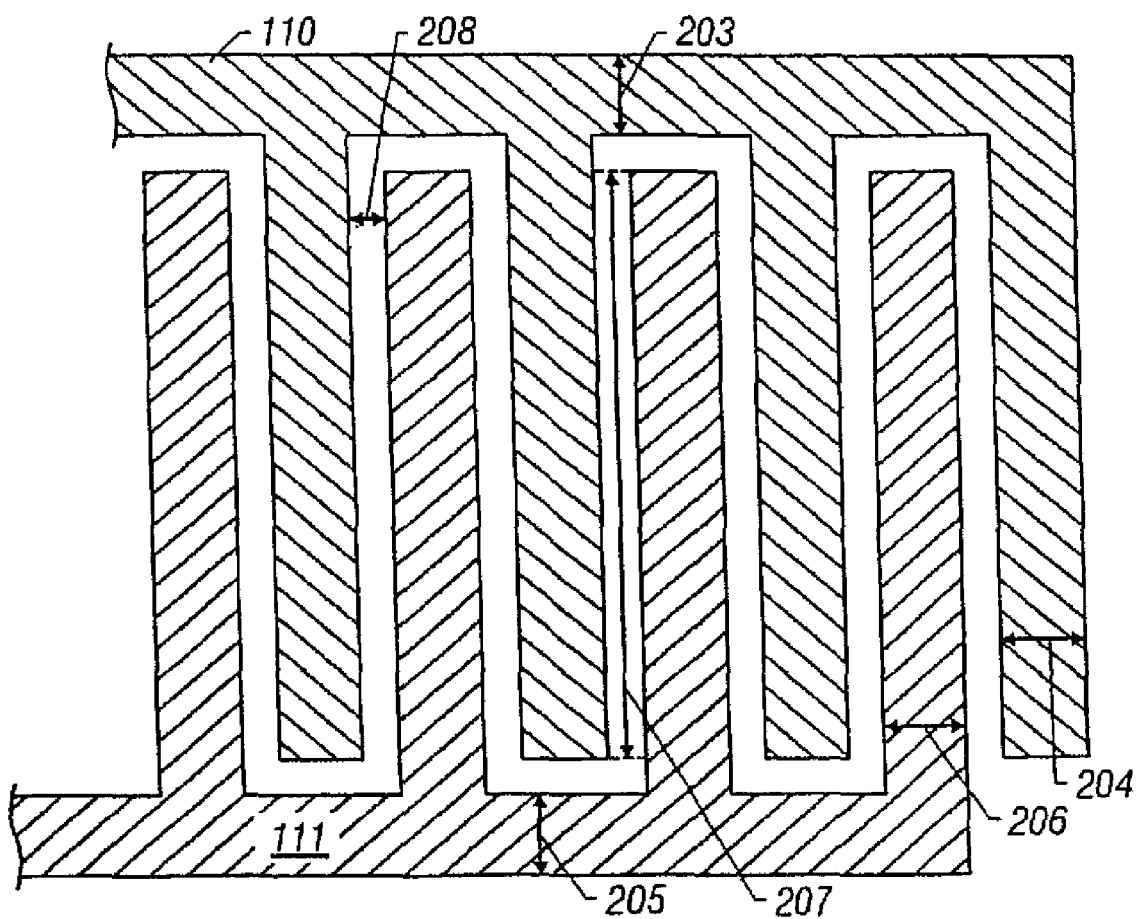
FIG. 2 is a fragmentary top view of an electrode structure included in the liquid crystal display shown in FIG. 1.
Figure 3A:
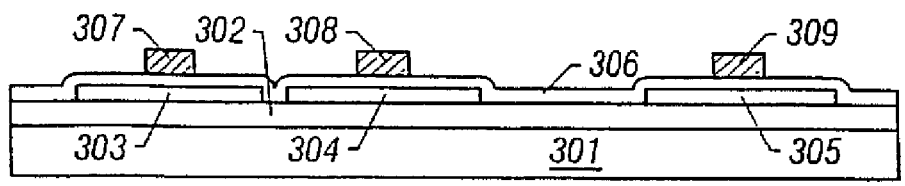
FIGS. 3(A)-3(F) are cross-sectional views of pixel TFTs and a peripheral driver circuit included in a liquid crystal display according to the invention.
Figure 3B:
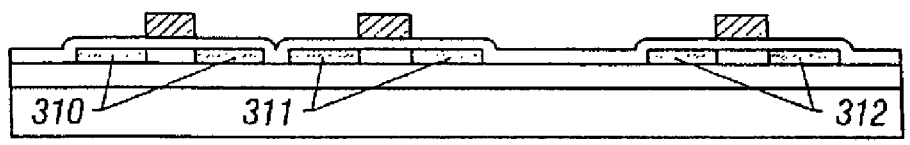
Figure 3C:
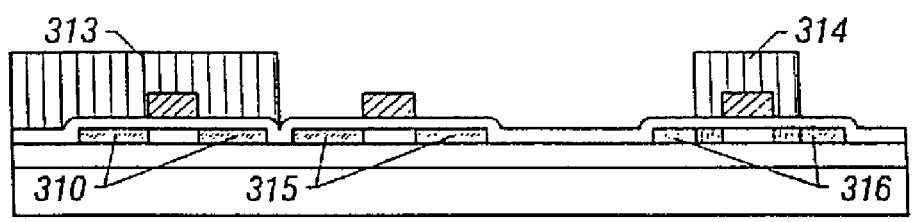
Figure 3D:
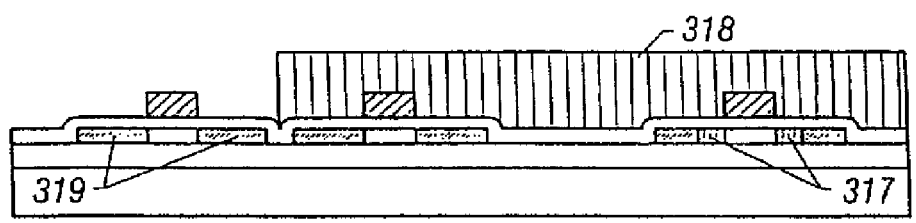
Figure 3E:
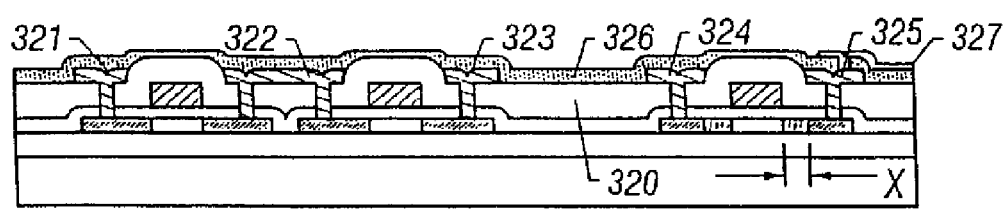
Figure 3F:
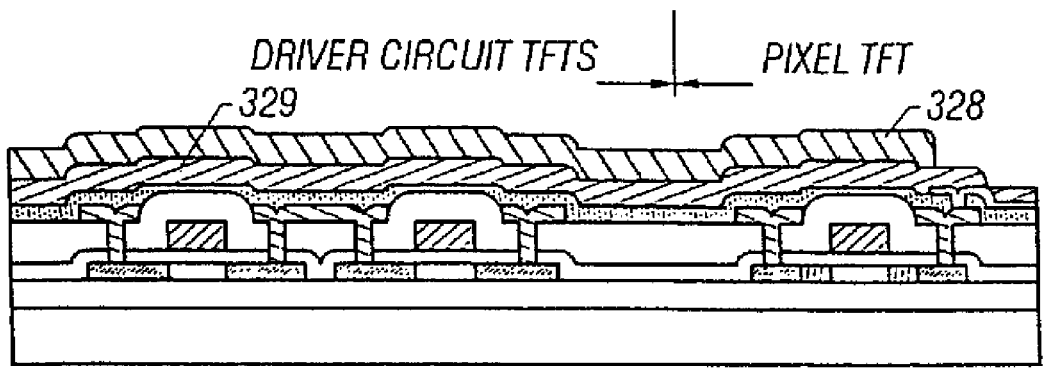

The present embodiment is a liquid crystal display making use of a multiplexing drive method. First, a glass substrate 101 was prepared as a first insulating substrate. An ITO film having a thickness of 1200 Å was formed and patterned into display electrodes. Then; an insulating film of SiN was grown on the ITO film to a thickness of 1000 Å. Another ITO film was formed on this insulating film to a thickness of 1200 Å and patterned to form a common electrode. The structure of the display electrodes and common electrode is shown in FIG. 2. The display electrodes, indicated by 110, took a comb-like form. The display electrodes 110 had horizontally extending portions and vertically extending portions. The vertically extending portions had a width, indicated by 203, of 10 μm. Also, the horizontally extending portions had a width, indicated by 204, of 10 μm. The common electrode 111 had horizontally extending portions and vertically extending portions. The vertically extending portions had a width, indicated by 205, of 10 μm. Also, the horizontally extending portions had a width, indicated by 206, of 10 μm. The length, 207, of the portions which are alternately nested in each other was 60 μm. The spacing 208 between the display and common electrodes was 5 μm. A film of Cr was formed on a second insulating substrate 102 to a thickness of 1200 Å. Reflecting function was imparted to the second insulating substrate.

In the present embodiment, the liquid crystal molecules were made to assume HAN orientation. For this purpose, an orientation film (not shown) was formed on each of the first substrate 101 and second substrate 102. A layer of polyimide was formed on the first substrate 101 by well-known spin-coating or DIP techniques. In order to orient the liquid crystal molecules parallel to the substrates, the polyimide film on the first substrate 101 was rubbed in a direction indicated by the arrows 108 in portions corresponding to the teeth of the display and common electrodes. A silane-coupling agent was applied to the second substrate 102. As a result, the liquid crystal molecules on the surface of the second substrate were oriented vertically.

The first substrate 101 and the second substrate 102 formed in this way were stacked on top of each other, thus forming a liquid crystal panel. Spherical spacers (not shown) having a diameter of 3 μm were sandwiched between the two substrates to make the substrate spacing uniform over the whole panel plane. An epoxy adhesive was used to bond together the substrates and to seal the panel. The patterned sealing adhesive was applied to a region (not shown) surrounding the pixel regions and the peripheral driver circuit region. The substrates were cut into a desired shape. A liquid crystal material having positive dielectric anisotropy was then injected between the substrates. Nematic liquid crystal ZLI-2293 ($\Delta\epsilon=+10$ at 1 kHz and at 20° C.) was used as the liquid crystal material.

Then, a biaxial film 104 and a polarizing plate 105 were successively stuck on the first substrate. The direction 107 of the optical axis of the polarizing plate made an angle of 45° to the rubbing direction.

This liquid crystal display was operated at a voltage of 3 V. An image display could be provided at a contrast of 100, a response speed of 2 ms, and a wide viewing angle.

Embodiment 2

A method of fabricating a substrate for use in a liquid crystal display utilizing the active matrix circuit of the present embodiment is next described.

A process sequence for obtaining a monolithic active matrix circuit of the present embodiment is described below by referring to FIGS. 3(A)-3(F). This process sequence makes use of a low-temperature polysilicon process. The left sides of FIGS. 3(A)-3(F) show steps for manufacturing TFTs forming a driver circuit. The right sides show steps for manufacturing TFTs forming the active matrix circuit.

First, a glass substrate 301 was prepared as the first insulating substrate. A silicon oxide film was formed as a buffer oxide film 302 on the glass substrate 301 to a thickness of 1000 to 3000 Å by sputtering techniques or plasma CVD in an oxygen ambient.

Then, an amorphous silicon film was formed to a thickness of 300 to 1500 Å, preferably 500 to 1000 Å, by plasma CVD or LPCVD. Thermal annealing was carried out above 500° C., preferably at a temperature of 500-600° C., to crystallize the silicon film or to enhance the crystallinity. Thereafter, photo-annealing might be effected, using a laser or the like, to enhance the crystallinity further. During crystallization utilizing the thermal annealing, a catalytic element such as nickel for promoting the crystallization of silicon may be added, as described in detail in Japanese Patent Laid-Open Nos. Hei 6-244103 and Hei 6-244104.

Subsequently, the silicon film was etched to form islands of active layers 303, 304 forming TFTs of the driver circuit and islands of an active layer 305 forming TFTs of the matrix circuit (pixel TFTs). The active layer 303 was used to form P-channel TFTs, while the active layer 304 was used to form N-channel TFTs. Then, a gate insulating film 306 of silicon oxide having a thickness of 500 to 2000 Å was formed by sputtering in an oxygen ambient. Instead, plasma CVD could be used to form the gate insulating film, in which case nitrous oxide (nitrogen monoxide) ($N_2O$) or mixture of oxygen ($O_2$) and monosilane ($SiH_4$) was advantageously used as a gaseous raw material.

Then, an aluminum film having a thickness of 2000 to 6000 Å was formed by sputtering techniques over the whole surface of the substrate. Silicon, scandium, palladium, or other element may be added to the aluminum to prevent generation of hillocks during thermal processes conducted later. The aluminum film was etched into gate electrodes 307, 308, and 309 (FIG. 3(A)).

Using these gate electrodes 307, 308, and 309 as a mask, phosphorus ions were introduced into every island of the active layers 303-305 by a self-aligned ion implantation process. At this time, phosphine ($PH_3$) was used as a dopant gas. The dose was $1\times10^{12}$ to $5\times10^{13}$ atoms/cm$^2$. As a result, weak N-type regions 310, 311, and 312 were formed (FIG. 3(B)).

Then, a photoresist mask 313 was formed over the active layer 303 forming the P-channel TFTs. Another photoresist mask 314 was formed parallel to the gate electrode 309 and over those portions of the active layer 305 forming the pixel TFTs which terminated in locations spaced 3 μm from the end of the gate electrode 309.

Again, phosphorus ions were introduced by an ion implantation process, using phosphine as a dopant gas. The dose was $1\times10^{14}$ to $5\times10^{15}$ atoms/cm$^2$. As a result, strong N-type regions (source and drain) 315, 316 were created. During this implantation step, no phosphorus ions were introduced into that region 317 of the weak N-type region 312 of the pixel TFT active layer 305 which was coated with the mask 314. Hence, this region 317 remained lightly doped N-type (FIG. 3(C)).

Then, the active layers 304 and 305 for the N-channel TFTs were coated with a photoresist mask 318. Boron ions were introduced into the islands 303 by ion implantation technology, using diborane ($B_2H_6$) as a dopant gas. The dose was $5\times10^{14}$ to $8\times10^{15}$ ions/cm$^2$. Since the dose of boron was in excess of the dose of phosphorus (FIG. 5(C)), the previously formed weak N-type region 310 was converted into a strong P-type region 319.

As a result of these ion implantation steps, strong N-type regions (source/drain) 315, 316, strong P-type region (source/drain) 319, and weak N-type region (lightly doped region) 317 were formed. In the present embodiment, the width x of the lightly doped region 317 was about 3 μm (FIG. 3(D)).

Thereafter, a thermal annealing step was carried out at 450 to 850° C. for 0.5 to 3 hours to heal the damage caused by the ion implantation, to activate the dopants and to recover the crystallinity of the silicon. Then, a silicon oxide film was formed as an interlayer insulator 320 to a thickness of 3000 to 6000 Å by plasma CVD over the whole surface. This interlayer insulator can be a silicon nitride film or a multilayer film consisting of silicon oxide and silicon nitride. The interlayer insulator film 320 was etched by wet etching techniques or dry etching techniques to form contact holes in the source/drain regions.

Subsequently, an aluminum film or a multilayer film of titanium and aluminum was formed to a thickness of 2000 to 6000 Å by sputtering techniques. This film was etched to form electrodes and conductive interconnects 321, 322, 323 of the peripheral circuit and electrodes and conductive interconnects 324, 325 of the pixel TFTs. This was followed by formation of a passivation film 326 having a thickness of 1000 to 3000 Å. The passivation film was made of silicon nitride. The passivation film was etched to create an interlayer insulator film. An ITO film 327 for forming display electrodes was formed to a thickness of 1200 Å on the interlayer insulator film and patterned in exactly the same way as the display electrodes of Embodiment 1.

Then, a silicon nitride film 329 was formed as a passivation film to a thickness of 1000 to 3000 Å by plasma CVD. An ITO film (not shown) having a thickness of 1200 Å was formed as a common electrode on the passivation film. This film was patterned into the same stripes as the common electrode of Embodiment 1 (FIG. 3(E)).

A black matrix 328 was formed on the laminate. In this embodiment, the black matrix 328 was at the highest level. The ITO layer and the black matrix may be interchanged in level. As the black matrix material, carbon black particles having an average diameter of 1000 Å were dispersed in an acrylic-based resinous material. The obtained solution was applied by spin-coating or printing techniques. Then, a pre-bake operation was performed at 100° C. for 2 minutes. The laminate was patterned by a well-known photolithography method. At this time, the intensity of the used ultraviolet irradiation was greater (more than 20 mW/cm$^2$) than the intensity used in normal patterning processes. Alternatively, after the formation of the black matrix, an oxygen-shielding film was made from PVA (polyvinyl alcohol) or the like. A developer solution obtained by dissolving 2.36% by weight of TMAH in water was used for development. Consequently, a black matrix having a thickness of 1 μm could be formed over all of the peripheral driver circuit, the pixel TFTs, and gate and source lines. The aperture ratio of the pixel regions was 60%.

In the present embodiment, the liquid crystal molecules were made to assume HAN orientation. For this purpose, an orientation film was formed on each of the aforementioned first and second substrates. A polyimide film was formed on the first substrate by well-known spin-coating or DIP techniques. To orient the liquid crystal molecules parallel to the substrates, the polyimide film on the TFT substrate was rubbed in a direction parallel to those portions which corresponded to the teeth of the display and common electrodes. The silane-coupling agent was applied to the second substrate. As a result, the liquid crystal molecules on the surface of the color filter substrate were oriented vertically.

The TFT substrate and counter substrate fabricated in this way were stacked on top of each other, thus forming a liquid crystal panel. The spherical spacers having a diameter of 3 μm were interposed between the two substrates to make the substrate spacing uniform over the whole panel plane. An epoxy adhesive was used to bond together the substrates and to seal the panel. The patterned sealing adhesive surrounded the pixel regions and the peripheral driver circuit region. The substrates were cut into a desired shape. A liquid crystal material was then injected between the substrates. Nematic liquid crystal ZLI-2293 was used as the liquid crystal material.

Then, a biaxial film 104 and a polarizing plate 105 were successively stuck on the first substrate. The direction 107 of the optical axis of the polarizing plate made an angle of 45° to the rubbing direction.

This liquid crystal display was operated at a voltage of 3 V. An image display could be provided at a contrast of 100, a response speed of 2 ms, and a wide viewing angle.

Embodiment 3

Figure 4:
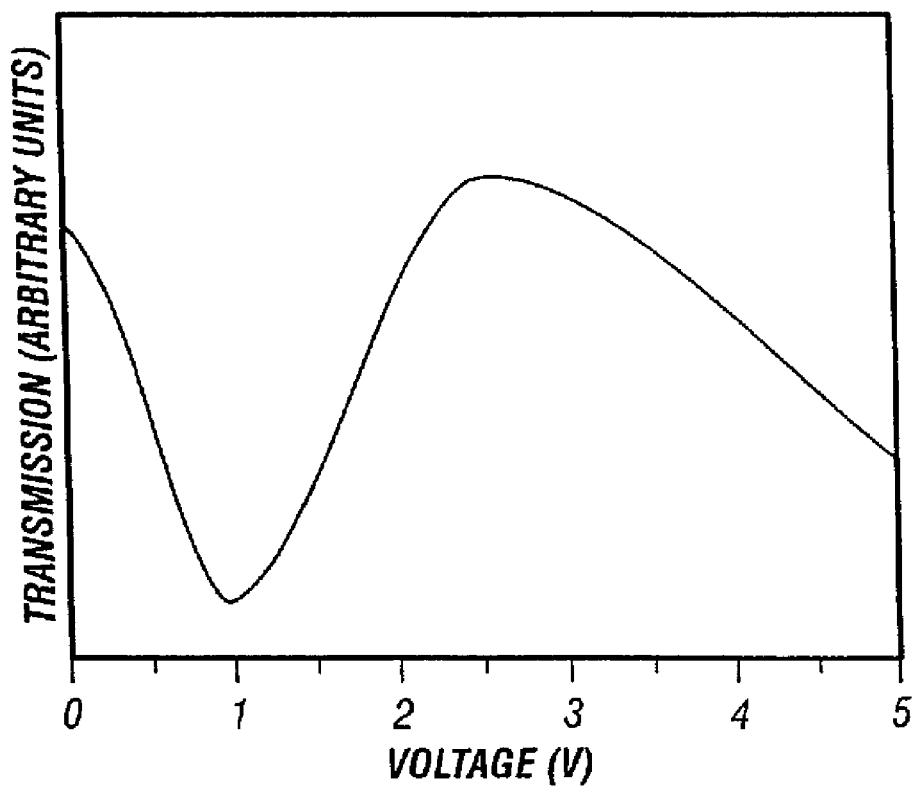
FIG. 4 is a graph illustrating the transmission-voltage characteristics of Embodiment 3 of liquid crystal display according to the invention.

In the present embodiment, a color display was provided using the liquid crystal display of Embodiment 2. As the pixel voltage applied across the liquid crystal display was varied, the intensity of transmitted light having a wavelength of 554.6 nm was varied. This is illustrated in FIG. 4. As can be seen from the graph of FIG. 4, the transmission varied continuously with varying the voltage. No clear threshold value existed. Variations in color hues were observed. When no voltage was applied, the device exhibited a color of yellow-green. When a voltage of 0.5 V was applied, it exhibited a color of green. When a voltage of 0.9 V was applied, it exhibited a color of blue. When a voltage of 1.2 V was applied, it exhibited a color of red.

A color display was provided, by making use of this phenomenon and by controlling the pixel voltage applied across the present embodiment of liquid crystal display. A multicolor display could be provided at an operating voltage of 3 V with a wide viewing angle.

The configuration of the present invention permits fabrication of a bright display device which needs no backlighting arrangement. Furthermore, the novel display device requires only one polarizing plate, unlike the prior art liquid crystal display. Consequently, a power consumption reduction can be accomplished. Furthermore, the operating voltage decrease makes it possible to use batteries as a power supply. This facilitates application to various portable electrical appliances.

What is claimed is:

1. A method of driving a liquid crystal display device, said liquid crystal display device comprising:
    a first substrate;
    a thin film transistor formed over the first substrate and comprising a metal gate electrode;
    a transparent pixel electrode electrically connected to the thin film transistor;
    a transparent common electrode formed above the transparent pixel electrode;
    an insulating film between the transparent pixel electrode and the transparent common electrode;
    a second substrate being disposed opposite to the first substrate;
    a liquid crystal material between the first and second substrates wherein the transparent common electrode is located between the liquid crystal material and the insulating film;
    said method comprising applying a voltage between the transparent pixel electrode and the transparent common electrode to drive the liquid crystal material.

2. The method according to claim 1, wherein the insulating film is a single layer.

3. The method according to claim 1, wherein the insulating film comprises a silicon nitride film.

4. The method according to claim 1, wherein the transparent pixel electrode comprises indium tin oxide.

5. The method according to claim 1, wherein the transparent common electrode and the transparent pixel electrode do not overlap with each other.

6. The method according to claim 1, wherein the liquid crystal display device is driven by an optically compensated birefringence mode.

7. The method according to claim 1, wherein the metal gate electrode comprises aluminum.

8. A method of driving a liquid crystal display device,
said liquid crystal display device comprising:
a first substrate;
a thin film transistor formed over the first substrate and comprising a metal gate electrode and a channel region adjacent to the metal gate electrode, the channel region comprising polycrystalline silicon;
a transparent pixel electrode electrically connected to the thin film transistor;
a transparent common electrode formed above the transparent pixel electrode;
an insulating film between the transparent pixel electrode and the transparent common electrode;
a second substrate being disposed opposite to the first substrate;
a liquid crystal material between the first and second substrates substrates wherein the transparent common electrode is located between the liquid crystal material and the insulating film;
said method comprising applying a voltage between the transparent pixel electrode and the transparent common electrode to drive the liquid crystal material.

9. The method according to claim 8, wherein the transparent pixel electrode comprises indium tin oxide.

10. The method according to claim 8, wherein the transparent common electrode and the transparent pixel electrode do not overlap with each other.

11. The method according to claim 8, wherein the liquid crystal display device is driven by an optically compensated birefringence mode.

12. The method according to claim 8, wherein the metal gate electrode comprises aluminum.

13. A method of driving a liquid crystal display device,
said liquid crystal display device comprising:
a first substrate;
a thin film transistor formed over the first substrate and comprising a metal gate electrode;
a transparent pixel electrode electrically connected to the thin film transistor;
a transparent common electrode formed over the transparent pixel electrode;
an insulating film between the transparent pixel electrode and the transparent common electrode;
a second substrate being disposed opposite to the first substrate;
a liquid crystal material between the first and second substrates wherein the transparent common electrode is located between the liquid crystal material and the insulating film;
said method comprising applying an electric field produced between the transparent pixel electrode and the transparent common electrode to the liquid crystal material.

14. The method according to claim 13, wherein the transparent pixel electrode comprises indium tin oxide.

15. The method according to claim 13, wherein the transparent common electrode and the transparent pixel electrode do not overlap with each other.

16. The method according to claim 13, wherein the liquid crystal display device is driven by an optically compensated birefringence mode.

17. The method according to claim 13, wherein the metal gate electrode comprises aluminum.

* * * * *